US007508793B2

(12) United States Patent
Haddad et al.

(10) Patent No.: US 7,508,793 B2
(45) Date of Patent: Mar. 24, 2009

(54) MICRO MOBILITY MANAGEMENT

(75) Inventors: Wassim Haddad, Montreal (CA); Suresh Krishnan, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 393 days.

(21) Appl. No.: 11/229,680

(22) Filed: Sep. 20, 2005

(65) Prior Publication Data

US 2006/0198370 A1    Sep. 7, 2006

Related U.S. Application Data

(60) Provisional application No. 60/658,567, filed on Mar. 7, 2005.

(51) Int. Cl.
*H04Q 7/00* (2006.01)
(52) U.S. Cl. ....................... 370/331; 455/436
(58) Field of Classification Search ................. 370/331; 455/436, 444
See application file for complete search history.

(56) References Cited

U.S. PATENT DOCUMENTS

2003/0225892 A1* 12/2003 Takusagawa et al. ........ 709/227

OTHER PUBLICATIONS

Rajeev Koodli, Fast Handovers for Mobile IPv6, Mipshop Working Group, Internet Draft, Jul. 19, 2004, draft-ietf-mipshop-fast-mipv6-02.txt.

Hesham Soliman et al., Hierarchical Mobile IPv6 Mobility Management (HMIPv6), Network Working Group, Internet Draft, Dec. 2004, draft-ietf-mipshop-hmipv6-04.txt.
D. Johnson et al., Mobility Support in Ipv6, Network Working Group, RFC 3775, Jun. 2004.
PCT Search Report dated Jun. 12, 2006 from corresponding application PCT/IB2006/050416.
W. Haddad et al., Optimizing Micromobility Management, Internet Draft, MIPSHOP Working Group, Apr. 2005.
H. Jung et al., Fast Handover Support in Hierarchical Mobile IPv6, Advanced Communication Technology 2004, the 6th International Conference on Phoenix Park, Korea, Feb. 9-11, 2004, Piscataway, NJ, USA, IEEE, vol. 2, Feb. 9, 2004.

(Continued)

*Primary Examiner*—Duc Nguyen
*Assistant Examiner*—Eric Elcenko
(74) *Attorney, Agent, or Firm*—Alex Nicolaescu; Ericsson Canada Inc.

(57) ABSTRACT

A MN, a method and a VMAP for increasing efficiency of handover of the MN from a AR1 to a AR2. The VMAP is hierarchically below a MAP and above the AR1. The MN has a RCoA valid under the MAP and a LCoA valid under the AR1. The VMAP comprises an OMM Function capable of receiving a PathUM thereby informing the VMAP that the MN 412 is handing over to the AR2, computing a LCoA2 valid under the AR2 and forwarding traffic received on the LCoA to the LCoA2. A VMAP Binding Cache Entry for the MN comprises at least the MN's RCoA, the MN's LCoA and a unique value associated with the MN. The VMAP, therewith, computes the LCoA2 using a same function as in the MN. Prior to receiving the PathUM, the VMAP could receive an E-LBA issued from the MAP and addressed to the LCoA comprising the MN's RCoA and the unique value associated with the MN and thereafter, creating or updating the VBCE for the MN using information included therein.

9 Claims, 10 Drawing Sheets

OTHER PUBLICATIONS

H. Soliman et al., Hierarchical Mobile IPv6 Mobility Management (HMIPv6), Internet Draft, Network Working Group, Oct. 2004.

S. Thomson et al., IPv6 Stateless Address Autoconfiguration, Internet Draft, IETF IPv6 Working Group, Jun. 14, 2004.

* cited by examiner

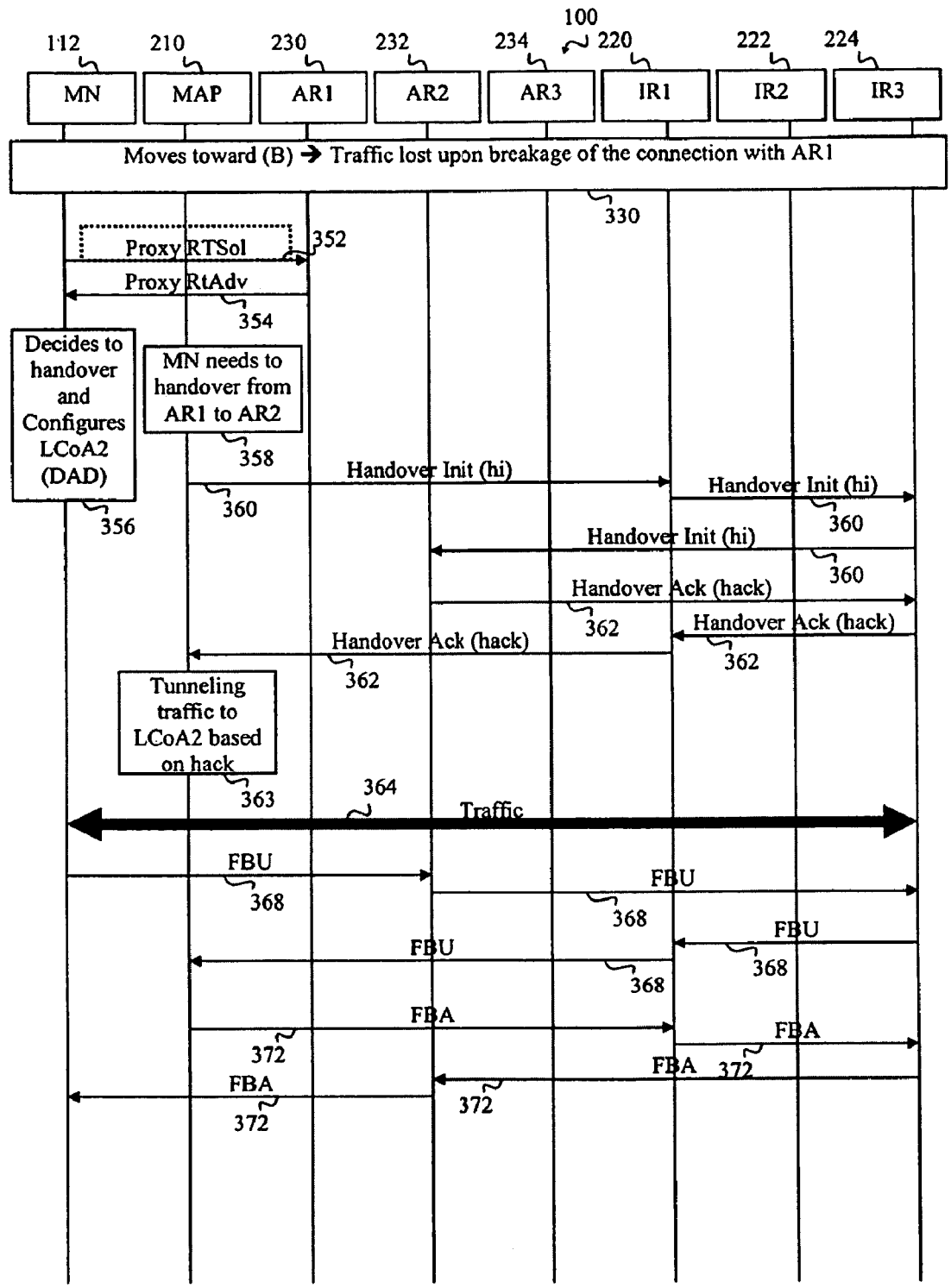
Figure 3 (Cont) Prior art

& 37 C.F.R. S.1.78

MICRO MOBILITY MANAGEMENT

PRIORITY STATEMENT UNDER 35 U.S.C S.119 (e) & 37 C.F.R. S.1.78

This non-provisional patent application claims priority based upon the prior U.S provisional patent applications entitled "Optimizing micromobility management (OMM)", application No. 60/658,567, filed Mar. 7, 2005, in the name of Wassim Haddad.

BACKGROUND OF THE INVENTION

1. Field of the Invention

The present invention relates to Mobile Internet Protocol version 6 (Mobile IPv6) and more particularly to optimizing management of the mobility by increasing handover performance in Mobile IPv6.

2. Description of the Related Art

Mobile IP version 4 (Mobile IPv4, Mobile IP, MIPv4 or MIP) and the current version of Mobile IPv6 (MIPv6) are built to provide mobility to a host or Mobile Node (MN). The other nodes, usually referred to as Correspondent Nodes as (CN), are usually seen as fixed hosts. Reference is now made to the drawings where FIG. 1 shows a MIPv6 network architecture as suggested by the current MIPv6 specification found in an Internet Engineering Task Force (IETF)'s Request For Comment (RFC) number 3775, herein included by reference. As can be seen in FIG. 1, an IP network 100 comprises a MN 110 in communication with a CN 120 on a link 122. The link 122 is unlikely to be composed of only one direct physical connection, but rather represents a series of links between routing equipments transparently enabling the communication therebetween. The way the series of links is used to transport traffic between the MN 110 and the CN 120 is irrelevant as long as IP communication therebetween can be established.

The MN 110 has a permanently assigned home address valid in its home network 127, which home address is allocated upon initialization of the MN 110 in the home network 127. The MN 110 is further in communication with a Home Agent (HA) 130 located in its home network 127. Among other functionalities, the HA 130 keeps record of a foreign address of the MN 110 valid outside the home network 127. The foreign address is called Care-of-Address (CoA) in the context of MIPv6. The CoA assigned to the MN 110 changes in time as the MN 110 moves from one network to another. The record kept by the HA 130, referred to as binding in the context of MIPv6, ties the CoA to the home address. A binding between the home address and the CoA is also kept in the CN 120 for the purpose of reaching the MN 110. The HA 130 is also responsible for routing traffic received at the home address to the MN 110. The traffic received is forwarded by the HA 120 on a link 125 toward the MN 110.

In an attempt to diminish the pressure on the HA 130 and the link 125 between the HA 120 and the MN 110, Hierarchical Mobile IPv6 mobility management (HMIPv6) was developed. The last publicly available version of the HMIPv6 protocol is specified in the IETF's Internet Draft<draft-ietf-mipshop-hmipv6-04.txt>, herein included by reference, also referred to hereinafter as the HMIPv6 specification.

FIG. 2 shows an HMIPv6 network architecture as specified by the HMIPv6 specification. In its simplest expression, the objective of HMIPv6 is to replace the MN 110 by an HMIPv6 domain 110', thereby diminishing the need to update the binding maintained at the HA 130. In order to do so, the HMPv6 domain 110' comprises a Mobile Anchor Point (MAP) 210. The MAP 210 could be seen as a local Home Agent in the HMIPv6 domain 110'. For the purpose of the example shown on FIG. 2, the MAP 210 is connected to an Intermediate Router IR1 220, which in turns connects to an Intermediate Router IR2 222 and an Intermediate Router IR3 224. An Access Router AR1 230 is connected to the IR1 220. An Access Router AR2 232 and an Access Router AR3 234 are both connected to the IR3 224. Various links 240 are used to route information between the nodes of the HMIPv6 domain 110'. Some further links 242 could also exist, but are not specified nor used in the HMIP6 specification (as shown by the dotted arrows of the links 242). The links 240 and 242 are usually wired links. The MAP 210 could also be connected to further intermediate routers and access routers, as shown by the dotted arrow 244. The MAP 210 is the entry point of the HMIPv6 domain 110' and, as such, would be connected to the link 125 of FIG. 1 in lieu of the MN 110. FIG. 2 also shows a MN 112 entering the HMIPv6 domain 110' in a first position A, and moving along to positions B and C. The MN 112 is connected to the AR1 230 via a link 250 while near position A, to the AR2 232 via a link 252 while near position B and to the AR3 234 via a link 254 while near position C. For illustrative purposes, all links are shown even if the MN 112 is closer to position B. The links 250 to 254 are usually wireless links.

FIG. 3 shows a nodal operation and flow chart of the actions and interactions between the MN 112 and the other nodes of the HMIPv6 domain 110' when the MN 112 enters therein (step 310). Shortly after 310, the MN 112 receives a Router Advertisement (RtAdv) 314 containing information on the MAP 210 and the sender of the RtAdv. An RtAdv message is sent periodically by each of the Access Routers of the HMIPv6 domain 110'. The MN 112 could also actively request the RtAdv 314 through an optional Router Solicitation (RtSol) 312 if it is not received or not received in due time in view of the MN 112 configuration. The RtSol 312 is a message sent to the multicast address and to which the receiving access routers (e.g. the AR1 230 and the AR2 232) respond with an appropriate RtAdv. Upon reception of the RtAdv 314 from the AR1 230, the MN 112 configures a Local Care-of-Address (LCoA), a Regional Care-of Address (RCOA) (step 316) and performs a Duplicate Address Detection (DAD) on its LCoA to make sure that the address is not already in use in the HMIPv6 domain 110'. It has already been determined through experiences that a typical DAD 316 procedure for the LCoA takes more than 2000 ms in a typical HMIPv6 implementation. The LCoA is valid under the AR1 230. In accordance with the HMIPv6 specification, the LCoA is a concatenation of the first 64 bits of the AR1's 230 subnet prefix (obtained in the RtAdv 314) and another 64 bits value provided by the MN 112. The RCoA is valid under the MAP 210. In accordance with the HMIPv6 specification, the RCoA is a concatenation of the first 64 bits of the MAP's 210 subnet prefix (obtained in the RtAdv 314) and another 64 bits value provided by the MN 112.

After step 316, the MN 112 informs the MAP 210 of its newly configured LCoA and RCoA by sending a Local Binding Update (LBU) 318 addressed to the MAP 210. The LBU 318 will follow the appropriate links 240, being forwarded along the HMIPv6 topology by the routers on its way, up to the MAP 210. As specified by the HMIPv6 specification, the MAP 210 will then perform a DAD (step 320) to make sure that no other under its responsibility is currently using the RCoA proposed by the MN 112. It has already been determined through experiences that a typical DAD 320 procedure for one RCoA address takes around 20-30 ms in a typical HMIPv6 implementation. If the DAD 320 is positive (i.e. if the RCoA and the LCoA are not already in use), the MAP 210 registers the RCoA and LCoA in a local binding and takes the appropriate steps (i.e. BU to the HA 130, not shown on FIG. 3) to register the RCoA with the HA 130. To confirm the local binding, the MAP 210 further sends a Local Binding Acknowledgement (LBA) 322 addressed to the LCoA of the MN 112. Thereafter, the MAP 210 acts as a local HA and receives all packets addressed to the RCoA on behalf of the MN 112 and encapsulates and forwards them directly to the MN's 112 LCoA. This is noted on FIG. 3 with the double arrow marked as 'Traffic' 324.

According to the HMIPv6 specification, when the MN 112 moves toward B (step 330), the MN 112 needs to handover from the AR1 230 to the AR2 232. For instance, where the links 250-254 are wireless, the HMIPv6 specification does not strictly provides a threshold to decide on the moment where the MN 112 should initiate or respond to a network initiated handover procedure. However, a measure of the quality of the wireless communication between the MN 112 and the AR1 230 can be used as a decision basis. If the handover is initiated by the MN 112, an RtSol 332 is sent, to which an RtAdv 334 is received. The RtAdv 334 could also be the first message of the network initiated handover procedure if it is not sent in response to the RtSol 332, but the MN 112 always has the last word on when the actual LCoA is dropped in favor of a newly configured LCoA2 (step 336), at which time the MN 112, as specified by the HMIPv6 specification, performs a DAD to make sure the LCoA2 is not already in use (again, +2000 ms). The LCoA2 is valid under the AR2 232. In accordance with the HMIPv6 specification, the LCoA2 is a concatenation of the first 64 bits of the AR2's 232 subnet prefix (obtained in the RtAdv 334) and another 64 bits value provided by the MN 112.

After step 336, the MN 112 informs the MAP 210 of its newly configured LCoA2 by sending a Local Binding Update (LBU) 338 addressed to the MAP 210. The LBU 338 will follow the appropriate links 240, being forwarded along the HMIPv6 topology by the routers on its way, up to the MAP 210. The MAP 210 then registers the LCoA2 replacing the LCoA in the local binding. No update of the HA 130 is necessary at this point since the RCoA did not change. To confirm the local binding, the MAP 210 further sends a Local Binding Acknowledgement (LBA) 342 addressed to the LCoA2 of the MN 112. Thereafter, the MAP 210 acts as a local HA and receives all packets addressed to the RCoA on behalf of the MN 112 and encapsulates and forwards them directly to the MN's 112 LCoA2. This is noted on FIG. 3 with the double arrow marked as 'Traffic' 344.

The decision as to when the handover should be initiated or accepted by the MN 112 is critical since the traffic will stop reaching the MN 112 upon breakage of the connection with the AR1 220. Considering the delay introduced by the handover procedure (2000 ms only for the DAD procedure of step 336 added to the forwarding time between the MAP 210 and the MN 112), it can be readily anticipated that the presented solution is not viable in an expected typical HMIPv6 implementation. This is especially problematic for conversational voice applications since a delay longer than 250 ms prevents the application from being viable.

Considering the problem, the Fast Handover Procedure was seen as a potential solution if applied in the context of HMIPv6. The Fast Handover Procedure is specified in the IETF's Internet Draft <draft-ietf-mipshop-fast-mipv6-02.txt>, herein included by reference, also referred to hereinafter as the Fast Handover specification. The basic feature of the Fast Handover specification is to enable the AR1 220 currently serving the MN 112 to send information regarding neighboring Access Routers, thereby enabling a faster configuration of the LCoA2. The HMIPv6 specification provides a proposed adaptation of the Fast Handover specification in its appendix 1. FIG. 3B presents the adaptation in the context of the already developed example of FIG. 3.

On FIG. 3B, the step 330 of moving toward B is the starting point of the Fast Handover modified by the HMIPv6 specification. Thereafter, the MN 112 sends a Proxy RtSol (PrRtSol) 352 to the AR1, which responds thereto with a Proxy RtAdv (PrRtAdv) 354 on behalf of the AR2 232. The PrRtAdv 354 could also be sent spontaneously from the AR1 220, but the threshold for such an event is not specified. At about the same time the PrRtAdv 354 is sent, the MAP 310 decides (step 358) that a handover needs to take place for the MN 112 from the AR1 230 to the AR2 232. Unfortunately, no guidance as to how the MAP 210 could take such a decision 358 was understood in the Fast Handover specification or, more pertinently, in the HMIPv6 specification. If there is a mechanism specified, it could not be understood to enable the MAP 210 to take the decision 358 and the MAP 210 is not positioned in the HMIPv6 topology to efficiently obtain information on the quality of the communication between the AR1 230 and the MN 112. Presuming that the decision 358 could be somehow taken at the appropriate moment (i.e. at about the same time the PrRtAdv 354 is sent), the MAP sends a Handover Initiate (hi) addressed to the AR2 to inform the node of the incoming MN 112. The AR2 further replies with a Handover Acknowledge (hack) 362 specifying if the handover can take place. If the hack 362 is positive (i.e. handover can take place), the MAP 210, upon reception thereof, start tunneling traffic received on LCoA to LCoA2. This is noted on FIG. 3B with the double arrow marked as 'Traffic' 364.

At some point after reception of the PrRtAdv 354, the MN 112 should decide to proceed with the handover from the AR1 230 to the AR2 232. However, again, no threshold is specified. Whenever the decision is taken, the MN 112 configures a LCoA2 (step 356) in a similar way to what was already presented, concatenating the first 64 bits of the AR2's 232 subnet prefix (obtained this time from the PrRtAdv 354 instead of the RtAdv 334) and another 64 bits value provided by the MN 112. At step 356, the MN 112, as specified by the HMIPv6specification, also performs a DAD to make sure the LCoA2 is not already in use (again, +2000 ms). The MN 112 then sends a Fast local Binding Update (FBU) 370 within the HMIPv6 topology up to the MAP 210. The MAP 210 then updates its Local Binding to change the LCoA for the LCoA2 before sending a Fast local Binding Acknowledgement (FBA) 372.

This Fast Handover in the context of HMIPv6 alternative has the advantage of allowing traffic 364 before the exchange of the FBU 368 and the FBA 372, but still uses the DAD in step 356 (+2000 ms) to validate the LCoA2. In cases where the LCoA2 is not valid, the handover is not performed properly and the situation is reverted back to the inadequate procedure shown on FIG. 3. Another problem of the procedure shown on FIG. 3B lies, however, in the synchronization between the decision to handover of the MN 112 (step 356) and the decision of the MAP 210 to initiate the handover (step 358). As mentioned earlier, the mechanism necessary to inform the MAP 210 of the relevance of a handover of the MN 112 from the AR1 230 to the AR2 232, if ever specified in either of the HMIPv6 or Fast Handover specifications, was not understood. Furthermore, the MAP 210 is not positioned in the HMIPv6 topology to efficiently obtain information on the quality of the communication between the AR1 230 and the MN 112, and moving the MAP 210 closer to the MN 112 would substantially reduce the advantage of the MAP function as such (i.e. to reduce the signaling toward the HA 130).

As can be appreciated, there is a need for a handover solution, compatible with the HMIPv6 topology, that is efficient enough to support requirements of various applications such as conversational voice applications or other time dependent applications.

SUMMARY OF THE INVENTION

A first aspect of the present invention is direct to a Virtual Mobile Anchor Point (VMAP) in a Mobile Internet Protocol version 6 (MIPv6) network for increasing efficiency of handover of a Mobile Node (MN) from a first Access Router (AR1) to a second Access Router (AR2), wherein the VMAP is hierarchically below a Mobile Anchor Point (MAP) and above the AR1 and wherein the MN has a Regional Care-of Address (RCoA) valid under the MAP and a first Local Care-of Address (LCOA) valid under the AR1, the VMAP comprising an improved Micro Mobility Management (OMM) Function. The OMM Function is capable of receiving a Path Update Message (PathUM) thereby informing the VMAP that the MN 412 is handing over to the AR2, computing a second Local Care-of Address (LCoA2) valid under the AR2 and forwarding traffic received on the LCoA to the LCoA2.

Optionally, the VMAP could comprise a VMAP Binding Cache Entry (VBCE) for the MN comprising at least the MN's RCoA, the MN's LCoA and, a unique value associated with the MN. In such a case, computing the LCoA2 is performed by using the following function:

LCoA2 equals the first 64 bits corresponding to the AR2's subnet prefix concatenated with 64 bits obtained by hashing together the MN's RCoA, the MN's LCoA and the unique value associated with the MN.

The OMM Function of the VMAP could also be further capable of, prior to receiving the PathUM, receiving an Extended-Local Binding Acknowledgement (E-LBA) issued from the MAP addressed to the LCoA, wherein the E-LBA comprises at least the MN's RCoA and the unique value associated with the MN and, if the VBCE for the MN already exist, updating the VBCE for the MN using information included in the E-LBA or, if the VBCE for the MN does not exist, creating the VBCE for the MN using information included in the E-LBA.

Furthermore, the OMM Function of the VMAP could also be further capable of receiving the PathUM issued by one of a group consisting of the AR2 and the MN and, if the PathUM is issued from the MN, extracting the first 64 bits corresponding to the AR2's subnet prefix from within the PathUM sent directly to the VMAP and, if the PathUM is issued from the AR2, extracting the first 64 bits corresponding to the AR2's subnet prefix from a source address field of the PathUM address to the LCoA.

Another optional implementation suggests that the OMM Function of the VMAP could also be further capable of receiving a Binding Lifetime value in the E-LBA, adding the Binding Lifetime value to the VBCE for the MN and removing the VBCE for the MN upon expiration of the Binding Lifetime.

The OMM Function of the VMAP could also be further capable of receiving an Extended Router Solicitation (E-RtSol) from a second Mobile Node (MN2) whereby the MN2 requests handover to the VMAP and wherein the E-RtSol comprises its previous LCoA (LCoA-MN2), sending a PathUM addressed to the LCoA-MN2 and sending a Router Advertisement (RtAdv) to the MN2.

A second aspect of the present invention is directed to a method for handing over of a Mobile Node (MN) in a Mobile Internet Protocol version 6 (MIPv6) network from a first Access Router (AR1) to a second Access Router (AR2), wherein a Virtual Mobile Anchor Point (VMAP) is hierarchically below a Mobile Anchor Point (MAP) and above the AR1 and wherein the MN has a Regional Care-of Address (RCOA) valid under the MAP and a first Local Care-of Address (LCOA) valid under the AR1. The method comprises steps of receiving, at the VMAP, a unique value for the MN and the MN's RCoA in an Extended Local Binding Acknowledgment (E-LBA) addressed to the LCoA from the MAP, creating a VMAP Binding Cache Entry for the MN, at the VMAP, in which the unique value for the MN is kept together with the LCoA and the RCoA, sending, from the MN, an extended Router Solicitation Message (E-RtSol) to the AR2 thereby requesting handover of the MN to the AR2, the E-RtSol comprising the MN's LCoA, sending, from the AR2, a Router Advertisement Message (RtAdv) to the MN, sending, from the AR2, a Path Update Message (PathUM) addressed to the first LCoA of the MN, receiving, at the VMAP, the PathUM, computing, at the VMAP, a second LCoA (LCoA2) of the MN and forwarding, at the VMAP, traffic received on the LCoA to the LCoA2.

A third aspect of the present invention is directed to a Mobile Node (MN), in a Mobile Internet Protocol version 6 (MIPv6) network, connected to a first Access Router (AR1) using a first Local Care-of Address (LCOA) valid thereunder in a VMAP-enabled domain of the MIPv6 network, wherein the MN has a unique value associated therewith that is shared with a Mobile Anchor Point (MAP) of the VMAP-enabled domain and wherein the MN has a Regional Care-of Address (RCOA) valid under the MAP. The MN comprises an imprOved Micro Mobility Management (OMM) Function capable of detecting a need to handover from the AR1 to a second Access router (AR2), sending an Extended Router Solicitation (E-RtSol) to the AR2 comprising the LCoA, receiving a Router Advertisement (RtAdv) from the AR2, extracting 64 bits corresponding to the AR2's subnet prefix from the RtAdv and computing a second LCoA (LCoA2) valid under the AR2 using the following function:

LCoA2 equals the 64 bits corresponding to the AR2's subnet prefix concatenated with 64 bits obtained by hashing together the MN's RCoA, the MN's LCoA and the unique value associated with the MN.

Optionally, the OMM Function of the MN could be further capable of, before computing the LCoA2, sending a Path Update Message (PathUM) addressed to the AR1, the PathUM comprising at least the 64 bits corresponding to the AR2's subnet prefix.

Yet another option is for the OMM Function of the MN to be further capable of, after computing the LCoA2, sending a Path Update Message (PathUM) addressed to the LCoA, the PathUM comprising at least the 64 bits corresponding to the AR2's subnet prefix.

BRIEF DESCRIPTION OF THE DRAWINGS

A more complete understanding of the present invention may be obtained by reference to the following Detailed Description when taken in conjunction with the accompanying drawings wherein.

DETAILED DESCRIPTION OF THE PREFERRED EMBODIMENTS

The present invention provides an improved micro mobility management mechanism, compatible with HMIPv6. The improved mechanism takes advantage of existing address management procedures to ease the handover of a communication between a first access router to a new access router. In order to do so, a new function of Virtual Mobile Anchor Point is introduced nearer to the mobile nodes (MNs) in comparison to the MAP. For instance a MN could be connected to a first access router with a first address valid thereunder. A VMAP hierarchically responsible for the first access router keeps track of messages exchanged between the MAP and the MN. The VMAP further reacts as soon as a handover of the MN toward a new access router is confirmed by computing a new address of the MN valid under the new access router and tunneling the traffic received on the first address of the MN to the new address of the MN. The handover at the VMAP is confirmed by reception of a message to this effect from the new access router or from a second VMAP close to the new access router. When a procedure of local binding updates and acknowledgements is completed between the MN and the MAP, the VMAP stops receiving traffic on the first address of the MN since it has been decommissioned at the MAP level to the profit of the new address. The present invention also takes advantage of links possibly existing between routers outside the hierarchical tree topology (i.e. meshed network), even though it is not bound to the existence of those links.

Figure 1:
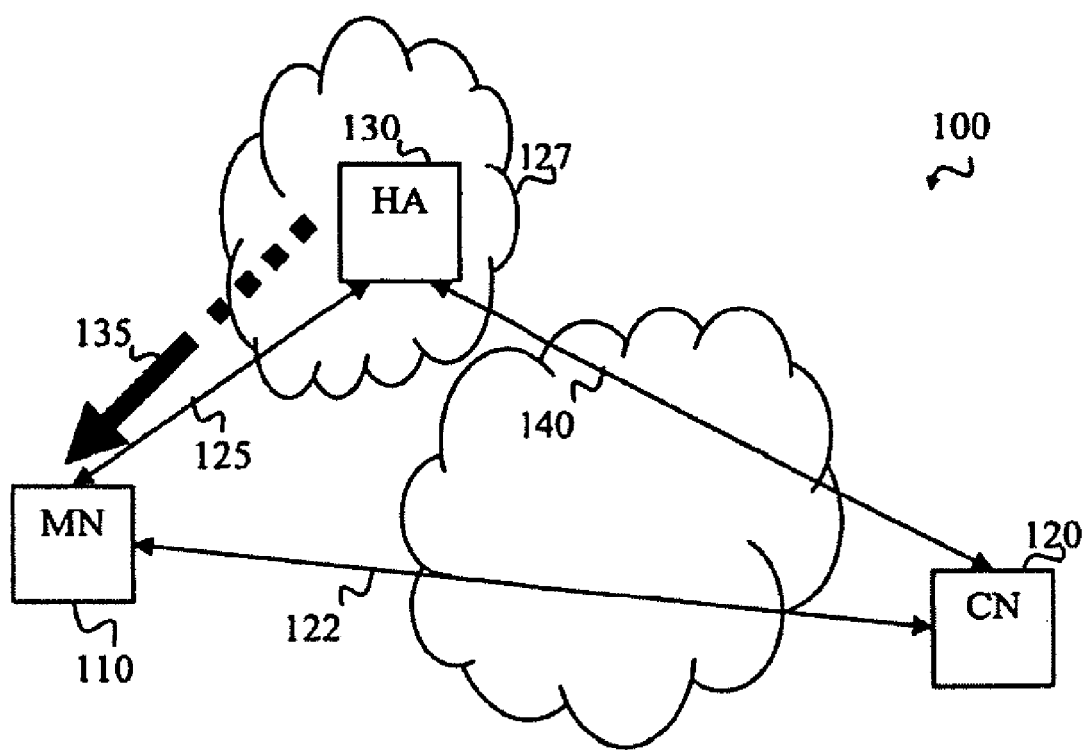
FIG. 1 is a prior art representation of a Mobile Internet Protocol version 6architecture.
Figure 2:
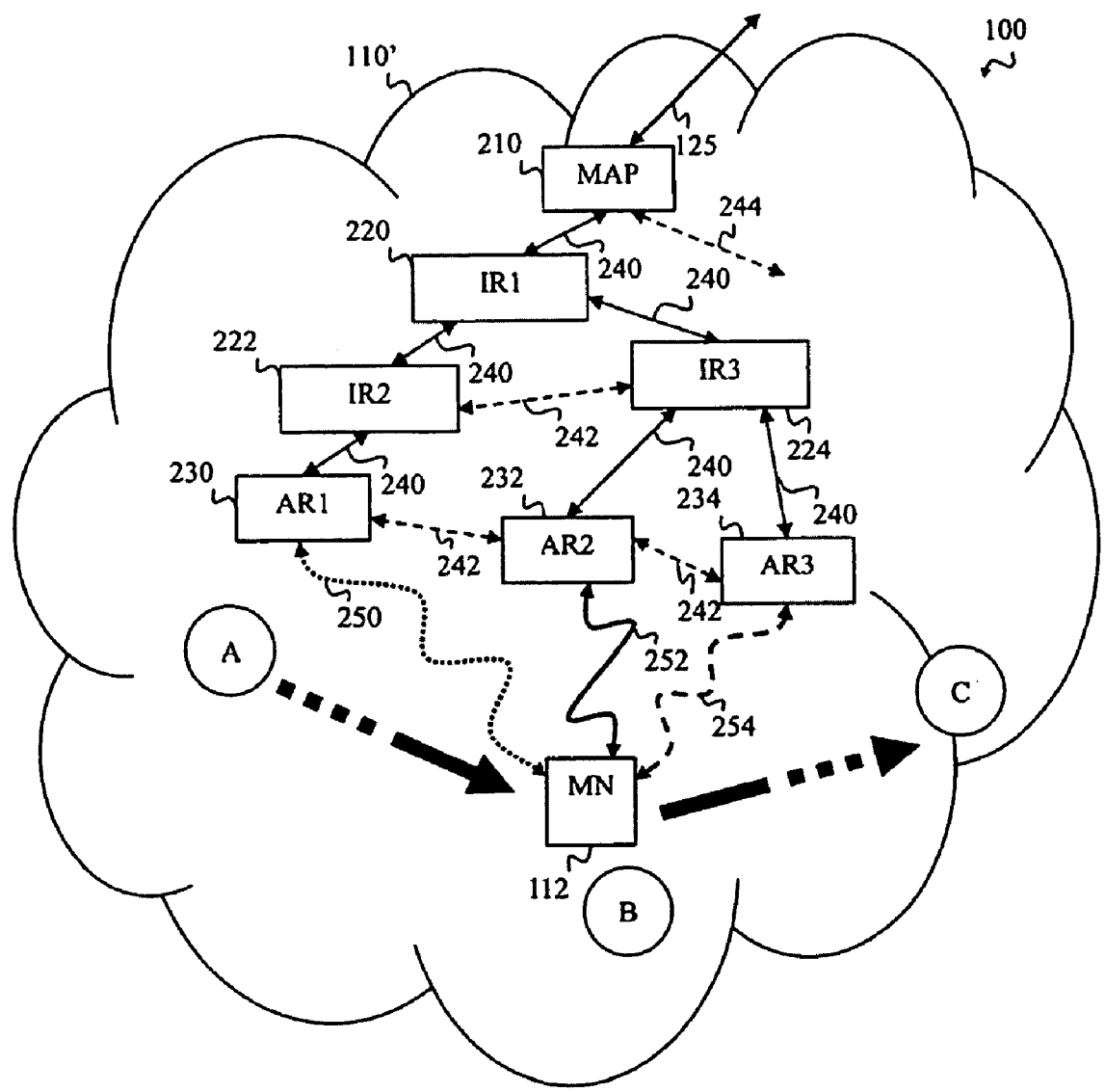
FIG. 2 is an HMIPv6 network architecture as specified by the HMIPv6specification in accordance with prior art.
Figure 4:
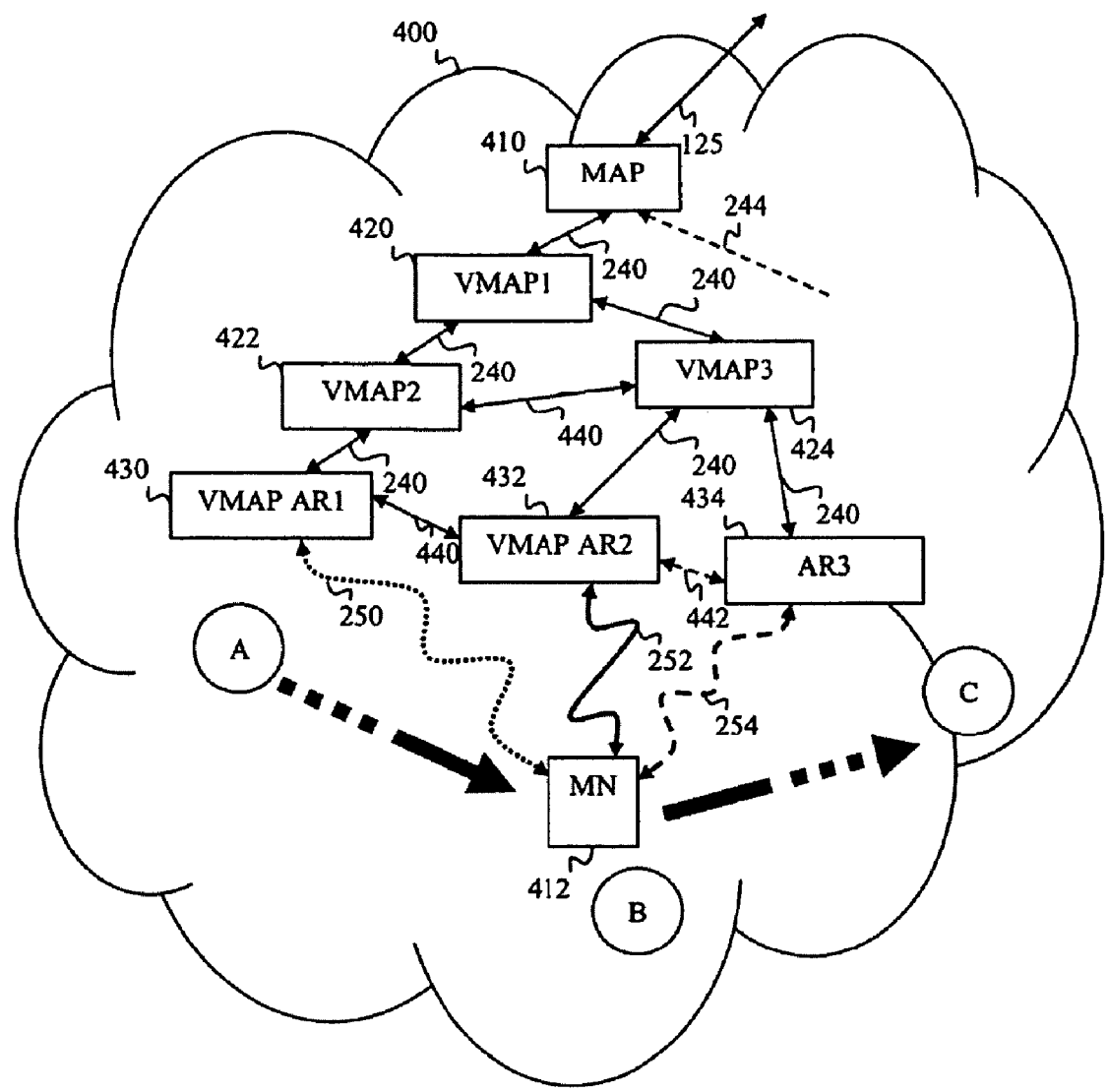
FIG. 4 is a network topology of an HMIPv6 compatible domain implementing the an improved Micro mobility Management (OMM) features in accordance with the teaching of the present invention.

FIG. 4 shows a network topology of an HMIPv6 compatible domain referred to as an imprOved Micro mobility Management (OMM) domain 400 in accordance with the teaching of the present invention. While the nodes of the OMM domain 400 have different capabilities, the hierarchical structure of the OMM domain 400 is similar to the hierarchical structure of the HMIPv6 domain 110' presented earlier. The OMM domain 400 comprises a Mobile Anchor Point (MAP) 410. The MAP 410 could be seen as a local Home Agent in the OMM domain 400. For the purpose of the example shown on FIG. 4, the MAP 410 is connected to a VMAP 1 420, which in turns connects to a VMAP2 422 and VMAP 424. A VMAP Access Router VAMP AR1 430 is connected to the VMAP1 420. A VMAP Access Router VMAP AR2 432 and an Access Router AR3 434 are both connected to the VMAP3 424. Various links 240 are used to route information between the nodes of the OMM domain 400. Some further links 440 could also exist in the OMM domain 400 between at least the VMAPs on the same hierarchical level (from the AR perspective). The present invention, as will be shown later, takes into account the possible presence of some further links 442, but they are not encouraged in view of the increase complexity triggered. The links 240, 440 and 442 are usually wired links. The MAP 410 could also be connected to further routers, as shown by the dotted arrow 244. The MAP 410 is the entry point of the OMM 400 and, as such, would be connected to the link 125 of FIG. 1 in lieu of the MN 110. FIG. 4 also shows a MN 412 entering the OMM domain 400 in a first position A, and moving along to positions B and C. The MN 412 is connected to the VMAP AR1 430 via a link 250 while near position A, to the VMAP AR2 432 via a link 252 while near position B and to the AR3 434 via a link 254 while near position C. For illustrative purposes, all links are shown even if the MN 412 is closer to position B. The links 250 to 254 are usually wireless links.

In the present invention, it is preferable, as will be apparent later, that all VMAP enabled routers in the OMM domain 400 can authenticate messages exchanged therebetween. This is likely to be done using keys preconfigured, but any other mechanism providing the authentication capability could be used. Furthermore, it is assumed that the MN 412 and the MAP 410 can both provide a same unique value associated with the MN 412. This could be a hashed value of an existing SecretKey previously established using, e.g. a Cryptographically Generated Address (CGA) mechanism, a certificate authority or any other mean. While the SecretKey is not and should not be made available to the other nodes of the OMM domain 400, there is no risk in providing the hash of the SecretKey (the original value being mathematically lost via the hash function). In the following discussion, for clarity purposes only, the hash(SecretKey) is used to represent the unique value associated with the MN 412.

Figure 5:
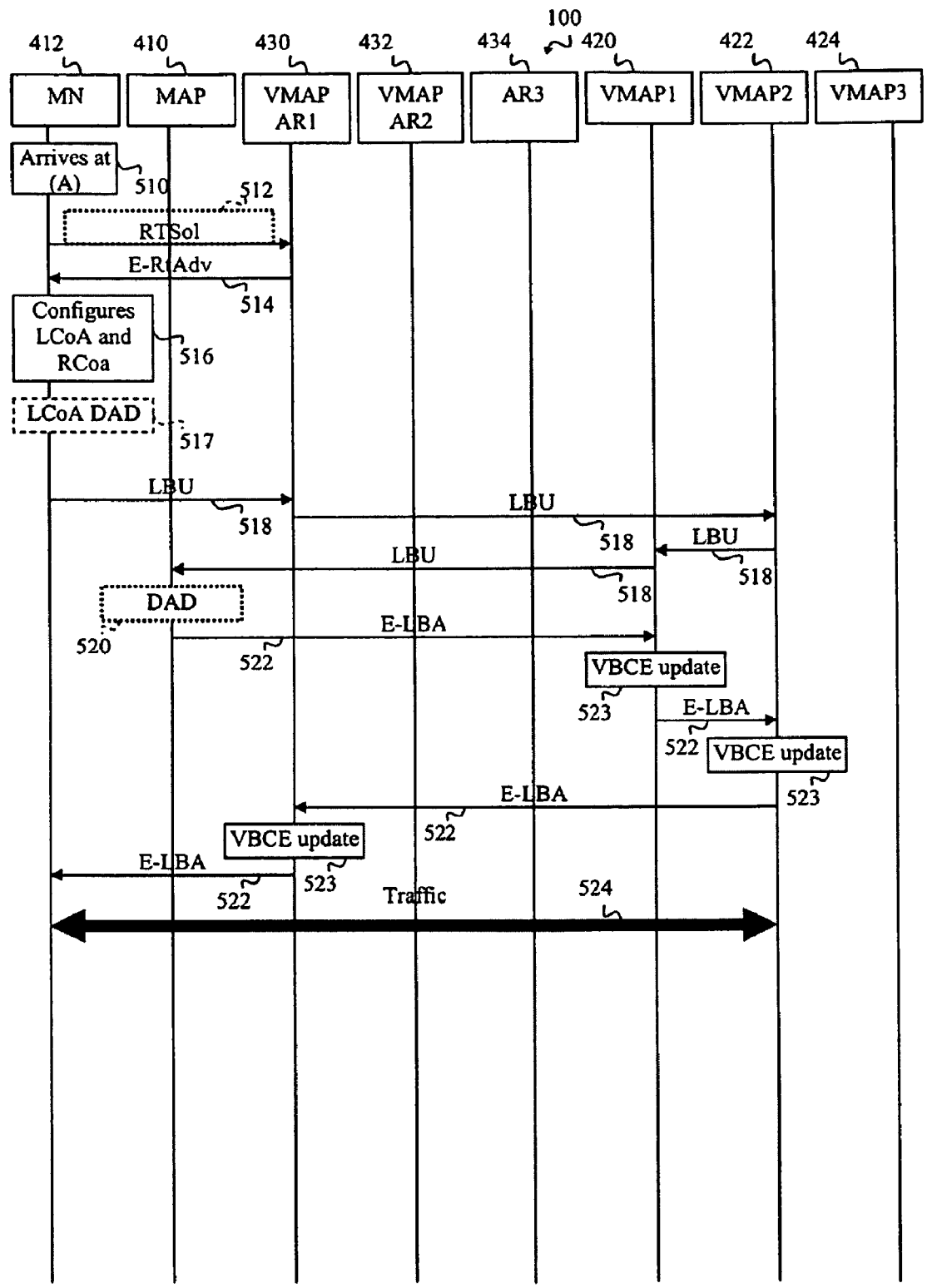
FIG. 5 is a nodal operation and flow chart of the actions and interactions between a Mobile Node and other nodes of an OMM domain when the MN enters therein in accordance with the present invention.

FIG. 5 shows a nodal operation and flow chart of the actions and interactions between the MN 412 and the other nodes of the OMM domain 400 when the MN 412 enters therein (step 510) at point A. Shortly after step 510, the MN 412 receives an Extended—Router Advertisement (E-RtAdv) 514 containing information on the MAP 510 and the sender of the E-RtAdv 514. The E-RtAdv 514 further contains an indication that the OMM domain 400 is VMAP-enabled (i.e. at least one VMAP is present in the OMM domain 400). The indication is likely to be implemented by addition of a flag bit into a regular RtAdv message (e.g. in the reserved bit area).

An E-RtAdv message is sent periodically by each of the Access Routers of the OMM domain 400. The MN 412 could also actively request the E-RtAdv 514 through an optional Router Solicitation (RtSol) 512 if it is not received or not received in due time in view of the MN 112 configuration. The RtSol 512 is a message sent to the multicast address and to which the receiving access routers (e.g. the VMAP AR1 430 and the VMAP AR2 432) respond with an appropriate E-RtAdv. Upon reception of the E-RtAdv 514 from the VMAP AR1 430 (assuming that, in the case where the links 250-254 are wireless, the AR1's 430 E-RtAdv 314 is the best E-RtAdv message received if more than one E-RtAdv is received; the best E-RtAdv meaning that the quality of the carrying signal of the E-RtAdv has the best properties as evaluated by the MN 412), the MN 412 configures a Local Care-of-Address (LCoA), a Regional Care-of Address (RCOA) (step 516). the MN 512, depending on the schemed used to establish the LCoA could also have to perform a Duplicate Address Detection (DAD) (step 517) on its LCoA to make sure that the address is not already in use in the OMM domain 400. Since it has already been determined through experiences that a typical DAD 517 procedure for the LCoA takes more than 2000 ms in a typical HMIPv6implementation, it would be advantageous to establish the LCoA using a unique suffix. The LCoA is valid under the VMAP AR1 430. In accordance with the HMIPv6 specification, the LCoA is a concatenation of the first 64 bits of the VMAP AR1's 430 subnet prefix (obtained in the E-RtAdv 514) and another 64 bits value provided by the MN 412. The RCoA is valid under the MAP 410. As mentioned earlier, it could be established differently advantageously, but this falls outside the scope of the present invention. Similarly, various mechanisms can be used to establish the RCoA. One of them is for the RCoA to be a concatenation of the first 64bits of the MAP's 410 subnet prefix (obtained in the E-RtAdv 514) and another 64 bits value provided by the MN 412.

After step 516, the MN 412 informs the MAP 410 of its newly configured LCoA and RCoA by sending a Local Binding Update (LBU) 518 addressed to the MAP 410. The LBU 518 will follow the appropriate links 240, being forwarded along the HMIPv6 topology by the routers on its way, up to the MAP 410. According to the HMIPv6 specification, the MAP 410 should then perform a DAD (step 520) to make sure that no other under its responsibility is currently using the RCoA proposed by the MN 412. The step 520 is seen as optional in the context of the present invention since it might not be necessary depending on the mechanism used to establish the RCoA. The MAP 410 then registers the RCoA and LCoA in a local binding and takes the appropriate steps (i.e. BU to the HA 130, not shown on FIG. 5) to register the RCoA with the HA 130. To confirm the local binding, the MAP 510 further sends an Extended Local Binding Acknowledgement (E-LBA) 522 addressed to the LCoA of the MN 412. The E-LBA 522 contains, on top of the usual information contained in a value corresponding to the hash of the SecretKey performed using an agreed hashing function (e.g. MD5, etc.). The E-LBA 522 further contains, in the best example, a Binding Lifetime and the RCoA of the MN 412. These three values could, for instance, be included in a single option field of the E-LBA 522. The reason for including this information in the E-LBA 522 will be apparent later on through the description of the present invention's handover functionality. Each VMAP receiving the E-LBA 522 (i.e. the VMAP1 420, the VMAP2 422 and the VMAP AR1 430) creates a Virtual Binding Cache Entry (VBCE) (step 523) having the following structure:

LCoA-RCoA—Binding Lifetime (if provided)—Hash (SecretKey)

The LCoA is identified from the destination field of the E-LBA 522. Thereafter, the MAP 410 acts as a local HA and receives all packets addressed to the RCoA on behalf of the MN 412 and encapsulates and forwards them directly to the MN's 412 LCoA. This is noted on FIG. 5 with the double arrow marked as 'Traffic' 524.

Figure 6:
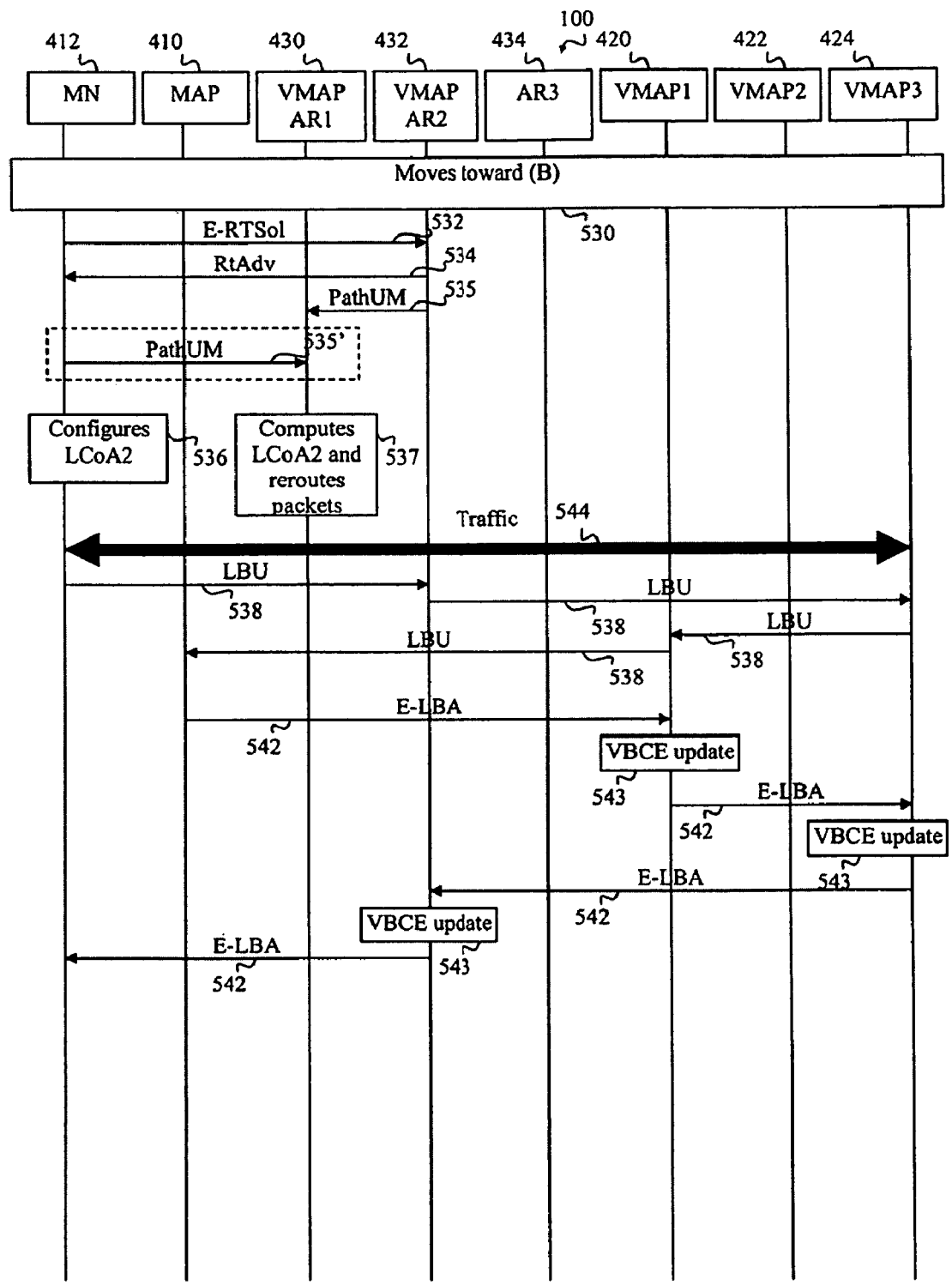
FIG. 6 is a nodal operation and flow chart of the actions and interactions between the MN and the other nodes of the OMM domain when the MN moves toward point B in accordance with the present invention.

FIG. 6 shows a nodal operation and flow chart of the actions and interactions between the MN 412 and the other nodes of the OMM domain 400 when the MN 412 moves toward point B (step 530). At this location, the MN 412 detects a need to handover from the VMAP AR1 430 to the VMAP AR2 432. If the links 250-254 are wireless, there is no strict threshold provided by the present invention to decide on the moment where the MN 412 should initiate a handover procedure. However, a measure of the quality of the wireless communication between the MN 412 and the VMAP AR1 430 can be used as a decision basis. In the present invention, the handover procedure needs to be initiated by the MN 412 by sending an E-RtSol 532 to the VMAP AR2 432 (i.e. the new access router). The E-RtSol comprises all information of an RtSol message to which the following values are added: LCoA (i.e. address valid under VMAP AR1 430) and, potentially, a value corresponding to the following function: Hash [Hash (SecretKey)|LCoA] (i.e. a hash of the hashed SecretKey together with the LCoA).

Upon reception of the E-RtSol 532, the VMAP AR2 432, sends an RtAdv 534 (or potentially a E-RtAdv). The VMAP AR2 432 should verify that the MN 412 is the actual source of the E-RtSol 532, otherwise the mechanism could be compromised. However, the specific details on the verification fall outside the scope of the present invention. Upon reception of the RtAdv 534, the MN 412 configures a LCoA2 (step 536) valid under the VMAP AR2 432 with the following formula:

LCoA2=first64 bits from the RtAdv's 534 source address (i.e. prefix of VMAP AR2 432) concatenated to the 64 bits from Hash[RCOA|Hash(SecretKey)|LCoA].

In such a scenario, there is no need to perform a DAD on LCoA2 (the DAD now being optional and discouraged) since this is obsoleted by the fact that the LCoA2 is obtained using only unique information already verified or provided by the MAP 410. It is mathematically proven that hashing provides a unique output for a unique entry.

In the best example, upon reception of the E-RtSol 532, the VMAP AR2 432 also sends a Path Update Message (PathUM) 535 addressed to the LCoA. The PathUM 535 is preferably signed using the authentication mechanism available between the routers of the OMM domain 400 (e.g. pre-configured keys). The PathUM 535 is sent outside of the hierarchical structure and makes use of the links 440, if available. In other words, the PathUM 535 is sent on an optimized path using a routing protocol such as Open Shortest Path First (OSPF) from the VMAP AR2 432 to the VMAP AR1 430 since the LCoA to which the PathUM 535 is addressed is under responsibility of the VMAP AR1 430. Another variant is to send a PathUM 535' from the MN 412 to the VMAP AR1 430 while the LCoA can still be used by the MN 412. This is seen as a less efficient option since it potentially uses a more costly air interface, but would still work properly for the purpose of the present invention, as long as the PathUM 535' further contains the subnet prefix of the VMAP AR2 432.

Upon reception of the PathUM 535 (or, incidentally, 535'), the VMAP AR1 430 checks if the LCoA is in one of its VBCE. To recall what has already been introduced, the VBCE lists the corresponding LCoA, the corresponding RCoA and the corresponding Hash(SecretKey) and possibly the Binding Lifetime and the PathUM 535 or 535' provides LCoA. If the LCoA is present in the VBCE, the VMAP AR1 430 checks the signature, if used, of PathUM 535 and, if valid, computes the LCoA2 with the same formula as the MN 412 (step 537).

LCoA2=first64 bits from the PathUM's 535 source address or from the content of the PathUM 535' (i.e. prefix of VMAP AR2 432) concatenated with the 64 bits from Hash [RCOA|Hash(SecretKey)|LCoA].

Again, the VMAP AR1 430 obtains the RCoA and the Hash(SecretKey) from the VBCE and the LCoA from the PathUM 535 or 535', being correlated using the VBCE's LCoA. Then, the VMAP AR1 430 updates the VBCE with the LCoA2 and immediately starts rerouting packets received on LCoA to the LCoA2 (step 537). The VMAP AR1 430 thus encapsulates and forwards packets received on the LCoA directly to the MN's 112 LCoA2 using the links 440 (e.g. via OSPF), if available. This is noted on FIG. 6 with the double arrow marked as 'Traffic' 544.

At this point, the MN 412 is effectively under responsibility of the VMAP AR2 432. Traffic received on the LCoA is effectively transferred to the newly configured LCoA2. The only missing step is to inform the MAP 410 in order for the LCoA to stop being used thereby to the profit of the LCoA2. This is done as previously with LBUs and E-LBAs. There could an advantage in delaying this update in access networks where a ping-pong between two access routers is frequent. Since no traffic loss is experienced and since the handover as proposed by the present invention is very efficient, the present invention could be used to ensure that there is a real need for handing over between two access routers by introducing a certain delay before initiating the formal update of the MAP's 410 local binding.

After step 536, the MN 412 can then inform the MAP 410 of its newly configured LCoA2 by sending a LBU 538 addressed to the MAP 410. The LBU 538 will follow the appropriate links 240, being forwarded along the HMIPv6 topology by the routers on its way, up to the MAP 410. The MAP 410 then registers the LCoA2 replacing the LCoA in the local binding. No update of the HA 130 is necessary at this point since the RCoA did not change. To confirm the local binding, the MAP 210 further sends an E-LBA 542 addressed to the LCoA2 of the MN 412. Thereafter, the MAP 410 acts as a local HA and receives all packets addressed to the RCoA on behalf of the MN 412 and encapsulates and forwards them directly to the MN's 412 LCoA2. At this point, the forwarding established at the VMAP AR1 430 stops being used since the LCoA is decommissioned at the MAP 410 level. The E-LBA 542 is used similarly to the E-LBA 522 presented earlier and therefore contains, in the best example, a Binding Lifetime and the RCoA of the MN 412. Each VMAP receiving the E-LBA 542 (i.e. the VMAP1 420, the VMAP3 424 and the VMAP AR2 432) creates or updates a Virtual Binding Cache Entry (VBCE) (step 543).

Figure 7:
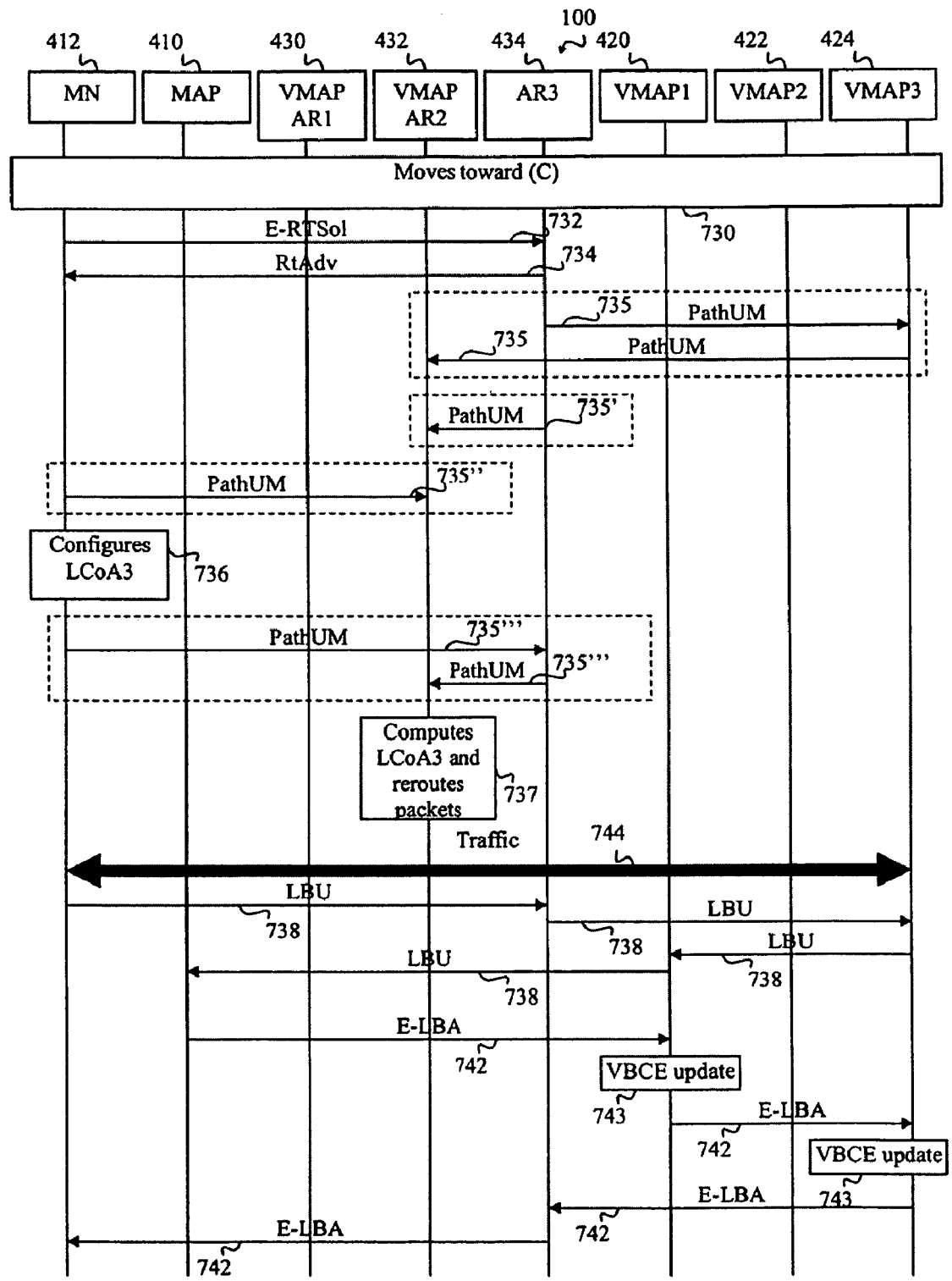
FIG. 7 is a nodal operation and flow chart of the actions and interactions between the MN and the other nodes of the OMM domain when the MN moves toward point C in accordance with the present invention.

FIG. 7 shows a nodal operation and flow chart of the actions and interactions between the MN 412 and the other nodes of the OMM domain 400 when the MN 412 moves toward point C (step 730). At this location, the MN 412 detects a need to handover from the VMAP AR2 432 to the AR3 434. If the links 250-254 are wireless, there is no strict threshold provided by the present invention to decide on the moment where the MN 412 should initiate a handover procedure. However, a measure of the quality of the wireless communication between the MN 412 and the VMAP AR2 432 can be used as a decision basis. As previously mentioned, the handover procedure needs to be initiated by the MN 412 by sending an E-RtSol 732 to the AR3 434 (i.e. the new access router). The E-RtSol comprises all information of an RtSol message to which the following values are added: LCoA2 (i.e. address valid under VMAP AR2 432) and, potentially, a value corresponding to the following function: Hash[Hash (SecretKey)|LCoA2] (i.e. a hash of the hashed SecretKey together with the LCoA2). The E-RtSol 732 is further signed with the value Hash(SecretKey) (in order to avoid false handover to be initiated from badly intentioned users).

Upon reception of the E-RtSol 732, the AR3 434 sends an RtAdv 734 (or potentially a E-RtAdv). Upon reception of the RtAdv 734, the MN 412 configures a LCoA3 (step 736) valid under the AR3 434 with the following formula:

LCoA3=first64 bits from the RtAdv's 734 source address (i.e. prefix of AR3 434) concatenated to the 64 bits from Hash[RCOA|Hash(SecretKey)|LCoA2].

Again, in such a scenario, there is no need to perform a DAD on LCoA3 (the DAD now being optional and discouraged) since this is obsoleted by the fact that the LCoA3 is obtained using only unique information already verified or provided by the MAP 410.

Figure 8:
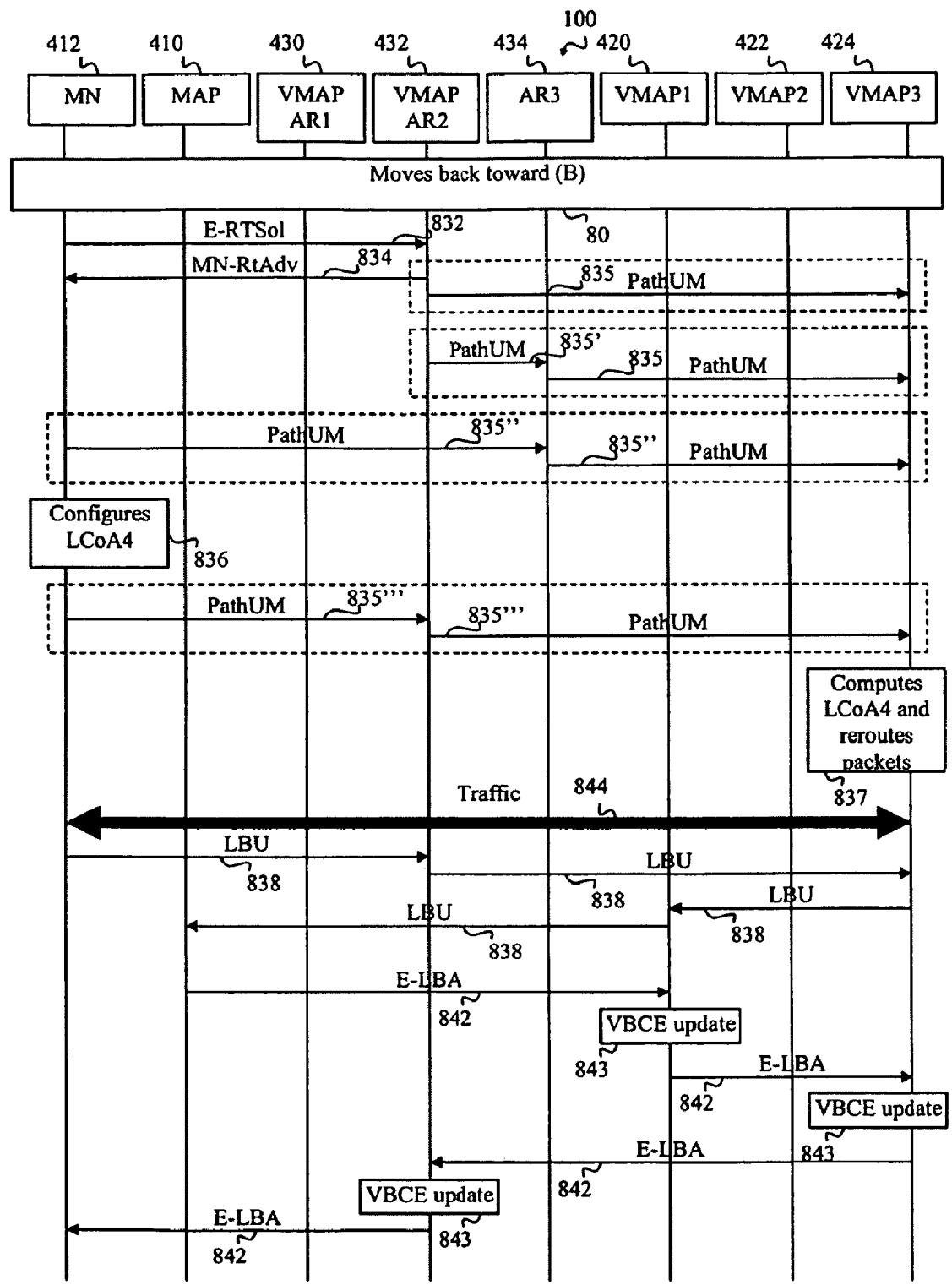
FIG. 8 is a nodal operation and flow chart of the actions and interactions between the MN and the other nodes of the OMM domain when the MN moves back toward point B in accordance with the present invention.

In the best example, since AR3 434 does not have VMAP capabilities, the link 442 between the AR3 434 and the VMAP AR2 342 does not exist (the link 442 has no impact at this moment, but its impact will better be understood with reference to FIG. 8). Upon reception of the E-RtSol 732, the AR3 434 sends a Path Update Message (PathUM) 735 addressed to the LCoA2. The PathUM 735 is preferably signed using the authentication mechanism available between the routers of the OMM domain 400 (e.g. preconfigured keys). In the best example, the PathUM 735 is sent inside the hierarchical structure and therefore passes by the VMAP3 424. If the link 442 exists, then a PathUM 735' identical to the PathUM 735 is sent directly thereon. Another variant is to send a PathUM 735" from the MN 412 to the VMAP AR2 432 while the LCoA2 can still be used by the MN 412. This is seen as a less efficient option since it potentially uses a more costly air interface, but would still work properly for the purpose of the present invention, as long as the PathUM 735" further contains the subnet prefix of the AR3 434. Yet another variant is to send a PathUM 735'" from the MN 412 to the VMAP AR2 432 after configuration of the LCoA3. In such a case, the presence or absence of the link 442 also needs to be considered. This is also seen as a less efficient option since it potentially uses a more costly air interface, but would still work properly for the purpose of the present invention, as long as the PathUM 735'" further contains the subnet prefix of the AR3 434.

Upon reception of the PathUM 735 (735', 735" or 735'"), the VMAP AR2 432 checks if the LCoA2 is in one of its VBCE. If the LCoA2 is present in the VBCE, the VMAP AR2 432 checks the signature, if used, of PathUM 735 or 735' and, if valid, computes the LCoA3 with the same formula as the MN 412 (step 737).

LCoA3=first64 bits from the PathUM's 735 or 735' source address or from the content of the PathUM 735" or 735'" (i.e. prefix of AR3 434) concatenated with the 64 bits from Hash [RCOA|Hash(SecretKey)|LCoA2].

Again, the VMAP AR2 432 obtains the RCoA and the Hash(SecretKey) from the VBCE and the LCoA2 from the PathUM 735 (735', 735" or 735'"), being correlated using the VBCE's LCoA2. Then, the VMAP AR2 432 updates the VBCE with the LCoA3 and immediately starts rerouting packets received on LCoA2 to the LCoA3 (step 737). The VMAP AR2 432 thus encapsulates and forwards packets received on the LCoA2 directly to the MN's 112 LCoA3 using the links 440 (if available) and potentially 442 (e.g. via OSPF). This is noted on FIG. 7 with the double arrow marked as 'Traffic' 744.

At this point, the MN 412 is effectively under responsibility of the AR3 434. Traffic received on the LCoA2 is effectively transferred to the newly configured LCoA3. The only missing step is to inform the MAP 410 in order for the LCoA2 to stop being used thereby to the profit of the LCoA3. This is done as previously with LBUs and E-LBAs.

After step 736, the MN 412 can then inform the MAP 410 of its newly configured LCoA3 by sending a LBU 738 addressed to the MAP 410. The LBU 738 will follow the appropriate links 240, being forwarded along the HMIPv6 topology by the routers on its way, up to the MAP 410. The MAP 410 then registers the LCoA3 replacing the LCoA2 in the local binding. No update of the HA 130 is necessary at this point since the RCoA did not change. To confirm the local binding, the MAP 210 further sends an E-LBA 742 addressed to the LCoA3 of the MN 412. Thereafter, the MAP 410 acts as a local HA and receives all packets addressed to the RCoA on behalf of the MN 412 and encapsulates and forwards them directly to the MN's 412 LCoA3. At this point, the forwarding established at the VMAP AR2 432 stops being used since the LCoA2 is decommissioned at the MAP 410 level. The E-LBA 742 is used similarly to the E-LBAs 542 and 522 presented earlier and therefore contains, in the best example, a Binding Lifetime and the RCoA of the MN 412. Each VMAP receiving the E-LBA 742 (i.e. the VMAP1 420 and the VMAP3 424) creates or updates a Virtual Binding Cache Entry (VBCE) (step 743).

FIG. 8 shows a nodal operation and flow chart of the actions and interactions between the MN 412 and the other nodes of the OMM domain 400 when the MN 412 moves back from point C to point B (step 830). At this location, the MN 412 detects a need to handover from the AR3 434 to the VMAP AR2 432. If the links 250-254 are wireless, there is no strict threshold provided by the present invention to decide on the moment where the MN 412 should initiate a handover procedure. However, a measure of the quality of the wireless communication between the MN 412 and the AR3 434 can be used as a decision basis. As previously mentioned, the handover procedure needs to be initiated by the MN 412 by sending an E-RtSol 832 to the VMAP AR2 432 (i.e. the new access router). The E-RtSol comprises all information of a RtSol message to which the following values are added: LCoA3 (i.e. address valid under AR3 434) and, potentially, a value corresponding to the following function: Hash[Hash (SecretKey)|LCoA3] (i.e. a hash of the hashed SecretKey together with the LCoA3. The E-RtSol 872 is further signed with the value Hash(SecretKey) (in order to avoid false handover to be initiated from badly intentioned users).

Upon reception of the E-RtSol 832, the VMAP AR2 432, sends a regular RtAdv as shown in the other examples of FIGS. 6 and 7 or, for the purpose of the present example, a MN-RtAdv 834 (potentially with the VMAP flag of a E-RtAdv). The MN-RtAdv further contains the address of the VMAP3 424 as it is the VMAP hierarchically over the VMAP AR2 432. Upon reception of the MN-RtAdv 834, the MN 412 configures a LCoA4 (step 836) valid under the VMAP AR2 432 with the following formula:

LCoA4=first64 bits from the RtAdv's 834 source address (i.e. prefix of VMAP AR2 432) concatenated to the 64 bits from Hash[RCOA|Hash(SecretKey)|LCoA3].

Again, in such a scenario, there is no need to perform a DAD on LCoA4 (the DAD now being optional and discouraged) since this is obsoleted by the fact that the LCoA4 is obtained using only unique information already verified or provided by the MAP 410.

In the best example, since AR3 434 does not have VMAP capabilities, the link 442 between the AR3 434 and the VMAP AR2 342 does not exist and, upon reception of the E-RtSol 832, the VMAP AR2 432 sends a Path Update Message (PathUM) 835 addressed to the LCoA3. The PathUM 835 is preferably signed using the authentication mechanism available between the routers of the OMM domain 400 (e.g. preconfigured keys). In the best example, the PathUM 835 is sent inside the hierarchical structure and reaches the VMAP3 424 directly. If the link 442 exists, then a PathUM 835' identical to the PathUM 835 is sent to the AR3 434 that further needs to forward it to the VMAP3 424 (since the AR3 434 does not have VMAP capabilities). Another variant is to send a PathUM 835'' from the MN 412 to the VMAP3 424 (address contained in MN-RtAdv 834) while the LCoA3 can still be used by the MN 412. This is seen as a less efficient option since it potentially uses a more costly air interface, but would still work properly for the purpose of the present invention, as long as the PathUM 835'' further contains the subnet prefix of the VMAP AR2 432. Yet another variant is to send a PathUM 835''' from the MN 412 to the VMAP3 424 (address contained in MN-RtAdv 834) after configuration of the LCoA4. in such a case, the prefix of the VMAP AR2 432 could be eliminated since the message will be sent thereby to the VMAP3 424. This is also seen as a less efficient option since it potentially uses a more costly air interface, but would still work properly for the purpose of the present invention.

Upon reception of the PathUM 835 (835', 835'' or 785'''), the VMAP3 424 checks if the LCoA3 is in one of its VBCE. If the LCoA3 is present in the VBCE, the VMAP3 424 checks the signature, if used, of PathUM 835 or 835' and, if valid, computes the LCoA4 with the same formula as the MN 412 (step 837).

LCoA4=first64 bits from the PathUM's 835 or 835' or 835''' source address or from the content of the PathUM 835'' (i.e. prefix of VMAP AR2 424) concatenated with the 64 bits from Hash[RCOA|Hash(SecretKey)|LCoA3].

Again, the VMAP3 424 obtains the RCoA and the Hash (SecretKey) from the VBCE and the LCoA3 from the PathUM 835 (835', 835'' or 835'''), being correlated using the VBCE's LCoA3. Then, the VMAP3 424 updates the VBCE with the LCoA4 and immediately starts rerouting packets received on LCoA3 to the LCoA4 (step 837). The VMAP3 424 thus encapsulates and forwards packets received on the LCoA3 directly to the MN's 112 LCoA4 using the links 240, in this case (e.g. via OSPF). This is noted on FIG. 8 with the double arrow marked as 'Traffic' 844.

At this point, the MN 412 is effectively under responsibility of the VMAP AR2 432. Traffic received on the LCoA3 is effectively transferred to the newly configured LCoA4. The only missing step is to inform the MAP 410 in order for the LCoA3 to stop being used thereby to the profit of the LCoA4. It could be noted that, in this particular case, there is no efficiency gain in the final update using LBUs and E-LBAs. However, the E-LBAs are important to enable further smooth handover.

After step 836, the MN 412 can then inform the MAP 410 of its newly configured LCoA4 by sending a LBU 838 addressed to the MAP 410. The LBU 838 will follow the appropriate links 240, being forwarded along the HMIPv6 topology by the routers on its way, up to the MAP 410. The MAP 410 then registers the LCoA4 replacing the LCoA3 in the local binding. No update of the HA 130 is necessary at this point since the RCoA did not change. To confirm the local binding, the MAP 210 further sends an E-LBA 842 addressed to the LCoA4 of the MN 412. Thereafter, the MAP 410 acts as a local HA and receives all packets addressed to the RCoA on behalf of the MN 412 and encapsulates and forwards them directly to the MN's 412 LCoA4. At this point, the forwarding established at the VMAP3 424 stops being used since the LCoA3 is decommissioned at the MAP 410 level. The E-LBA 842 is used similarly to the E-LBAs 742, 542 and 522 presented earlier and therefore contains, in the best example, a Binding Lifetime and the RCoA of the MN 412. Each VMAP receiving the E-LBA 842 (i.e. the VMAP1 420, the VMAP3 424 and the VMAP AR2 432) creates or updates a Virtual Binding Cache Entry (VBCE) (step 843).

Figure 9:
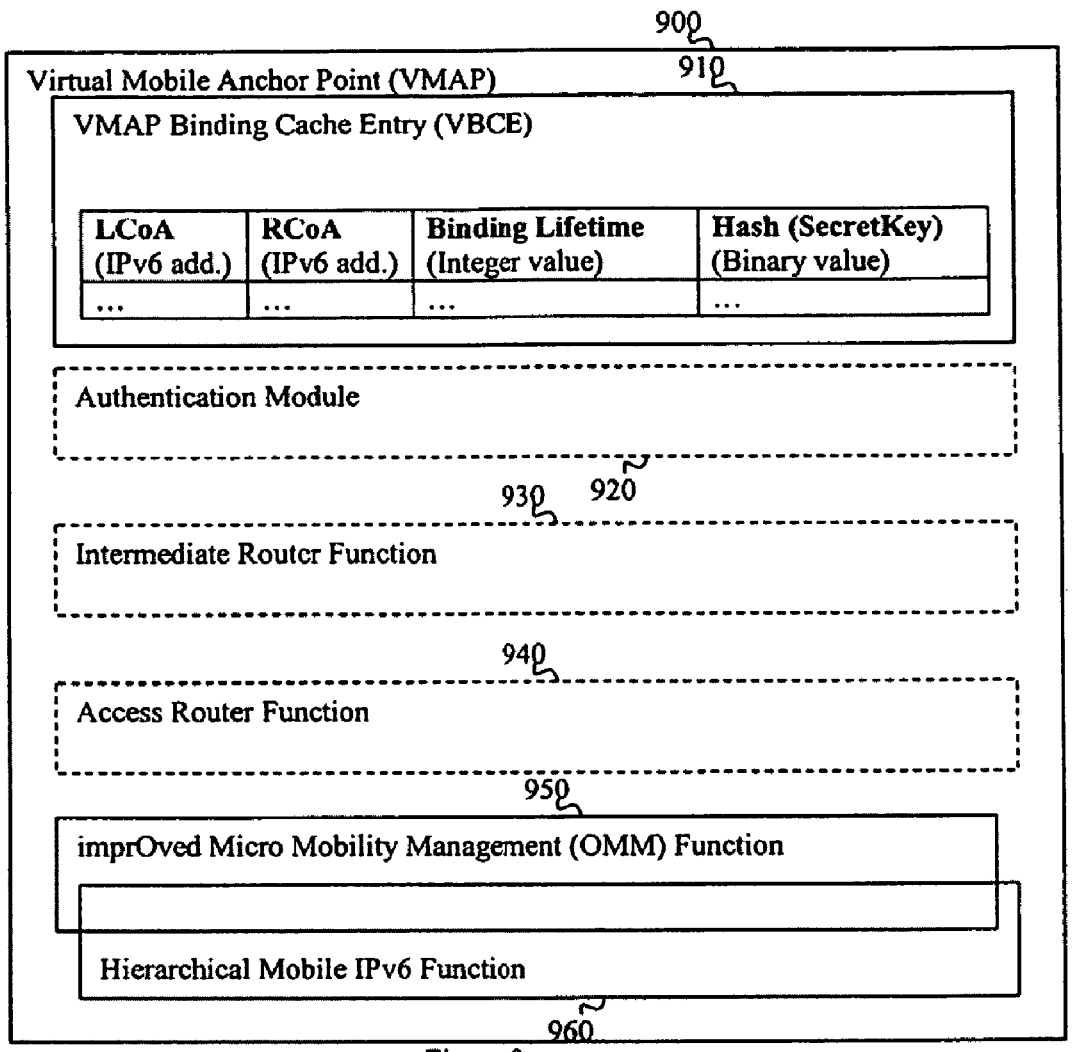
FIG. 9 is a modular representation of a VMAP in accordance with the teachings of the present invention.

FIG. 9 shows a modular representation of a VMAP 900 in accordance with the teachings of the present invention. The VMAP comprises a VBCE 910, could comprise an Authentication Module 920, an Intermediate Router Function 930 and an Access Router Function 940 and comprises imprOved Micro Mobility Management (OMM) Function 950 and a Hierarchical Mobile IPv6 Function 960. The Authentication Module 920 takes care, if used of authenticating messages exchanged with neighboring nodes and with the MN, as shown earlier. The Intermediate Router Function 930 is present in VMAP such as the VMAP3 424 shown earlier in order to work properly in this role. The Hierarchical Mobile IPv6Function 960 takes care of the existing HMIPv6 features as described earlier. The Access Router Function 940 is present in VMAP such as the VMAP AR2 432 shown earlier in order to work properly in this role. The Intermediate Router Function 930 and the Access Router Function 940 are not necessarily mutually exclusive.

The OMM Function 950 is capable of receiving one of the PathUM described earlier thereby informing the VMAP 950 that the MN 412 is handing over to a new AR, computing a new Local Care-of Address (nLCoA) valid under the new AR and forwarding traffic received on the MN's previous LCoA to the nLCoA.

The VBCE 910 for the MN comprises at least the MN's RCoA, the MN's LCoA and a unique value associated with the MN, wherein the step of computing the LCoA2 is performed by using the previously described function:

LCoA2 equals the first 64 bits corresponding to the new AR's subnet prefix concatenated with 64 bits obtained by hashing together the MN's RCoA, the MN's LCoA and the unique value associated with the MN.

Optionally, the OMM Function 950 could be further capable of, prior to receiving the PathUM, receiving an Extended-Local Binding Acknowledgement (E-LBA) issued from the MAP addressed to the LCoA. As shown earlier, the E-LBA comprises at least the MN's RCoA and the unique value associated with the MN. Thereafter, the OMM Function 950 could be further capable of performing one of the following steps:

if the VBCE for the MN already exist, updating the VBCE for the MN using information included in the E-LBA; and if the VBCE for the MN does not exist, creating the VBCE for the MN using information included in the E-LBA.

Furthermore, the OMM Function 950 could be further capable of receiving the PathUM issued by one of a group consisting of the AR2 and the MN and, if the PathUM is issued from the MN, extracting the first 64 bits corresponding to the AR2's subnet prefix from within the PathUM sent directly to the VMAP or if the PathUM is issued from the AR2, extracting the first 64 bits corresponding to the AR2's subnet prefix from a source address field of the PathUM address to the LCoA.

The OMM Function could also be further capable of receiving a Binding Lifetime value in the E-LBA, adding the Binding Lifetime value to the VBCE for the MN and removing the VBCE for the MN upon expiration of the Binding Lifetime.

As shown earlier, the VMAP 900, through its OMM Function 950 could be further capable of receiving an Extended Router Solicitation (E-RtSol) from a second Mobile Node (MN2) whereby the MN2 requests handover to the VMAP and wherein the E-RtSol comprises its previous LCoA (LCoA-MN2). Thereafter, the VMAP would send a PathUM addressed to the LCoA-MN2 and send a Router Advertisement (RtAdv) to the MN2.

Figure 10:
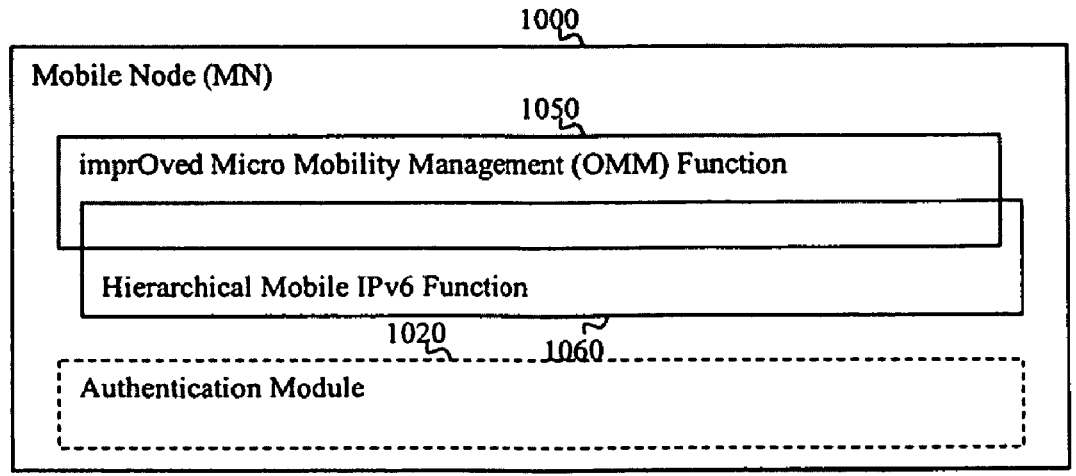
FIG. 10 is a modular representation of a Mobile Node in accordance with the teachings of the present invention.

FIG. 10 shows a modular representation of a MN 1000 in accordance with the teachings of the present invention. The MN 1000 comprises an Authentication Module 1020, an OMM Function 1050 and an HMIPv6 Function 1060. The Authentication Module 1020 takes care, if used, of authenticating messages exchanged with other nodes, as shown earlier. The Hierarchical Mobile IPv6 Function 1060 takes care of the existing HMIPv6 features as described earlier. The OMM Function is capable of detecting a need to handover from a first AR1 to a second Access router (AR2), sending an Extended Router Solicitation (E-RtSol) to the AR2 comprising the LCoA valid under the AR1, receiving a Router Advertisement (RtAdv) from the AR2, extracting 64 bits corresponding to the AR2's subnet prefix from the RtAdv and computing a second LCoA (LCoA2) valid under the AR2 using the following function:

LCoA2 equals the 64 bits corresponding to the AR2's subnet prefix concatenated with 64 bits obtained by hashing together the MN's RCoA, the MN's LCoA and the unique value associated with the MN.

Optionally, the OMM Function could be further capable of, before computing the LCoA2, sending a Path Update Message (PathUM) addressed to the AR1, the PathUM comprising at least the 64 bits corresponding to the AR2's subnet prefix.

Likewise, the OMM Function could also be further capable of, after computing the LCoA2, sending a Path Update Message (PathUM) addressed to the LCoA, the PathUM comprising at least the 64 bits corresponding to the AR2's subnet prefix.

It should be noted that there is no need for the two VMAPs between which the PathUM is, in the end, exchanged, to be under a single MAP, as long as a direct link exists therebetween.

Although several examples of the present invention have been illustrated in the accompanying drawings and described in the foregoing description, it will be understood that the invention is not limited to the embodiments disclosed, but is capable of numerous rearrangements, modifications and substitutions without departing from the teachings of the present invention. Furthermore, communication between nodes is likely to involve routing and forwarding of the information between many intermediate nodes. This does not affect present the invention and therefore is not mentioned explicitly in the description. In general, statements made in the description of the present invention do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. A Virtual Mobile Anchor Point (VMAP) in a Mobile Internet Protocol version 6 (MIPv6) network for increasing efficiency of handover of a Mobile Node (MN) from a first Access Router (AR1) to a second Access Router (AR2), wherein the VMAP is hierarchically below a Mobile Anchor Point (MAP) and above the AR1 and wherein the MN has a Regional Care-of Address (RCoA) valid under the MAP and a first Local Care-of Address (LCoA) valid under the AR1, the VMAP comprising:

an imprOved Micro Mobility Management (OMM) Function capable of:

receiving a Path Update Message (PathUM) thereby informing the VMAP that the MN 412 is handing over to the AR2;

computing a second Local Care-of Address (LCoA2) valid under the AR2; and forwarding traffic received on the LCoA to the LCoA2;

a VMAP Binding Cache Entry (VBCE) for the MN comprising at least:
the MN's RCoA;
the MN's LCoA; and
a unique value associated with the MN; and
wherein computing the LCoA2 is performed by using the following function:
LCoA2 equals the first 64 bits corresponding to the AR2's subnet prefix concatenated with 64 bits obtained by hashing together the MN's RCoA, the MN's LCoA and the unique value associated with the MN.

2. The VMAP of claim 1 wherein the OMM Function is further capable of:
prior to receiving the PathUM, receiving an Extended-Local Binding Acknowledgement (E-LBA) issued from the MAP addressed to the LCoA, wherein the E-LBA comprises at least the MN's RCoA and the unique value associated with the MN; and
performing one of the following steps:
if the VBCE for the MN already exist, updating the VBCE for the MN using information included in the E-LBA; and
if the VBCE for the MN does not exist, creating the VBCE for the MN using information included in the E-LBA.

3. The VMAP of claim 1 wherein the OMM Function is further capable of:
receiving the PathUM issued by one of a group consisting of the AR2 and the MN; and
if the PathUM is issued from the MN, extracting the first 64 bits corresponding to the AR2's subnet prefix from within the PathUM sent directly to the VMAP; and
if the PathUM is issued from the AR2, extracting the first 64 bits corresponding to the AR2's subnet prefix from a source address field of the PathUM address to the LCoA.

4. The VMAP of claim 2 wherein the OMM Function is further capable of:
receiving a Binding Lifetime value in the E-LBA;
adding the Binding Lifetime value to the VBCE for the MN; and
removing the VBCE for the MN upon expiration of the Binding Lifetime.

5. The VMAP of claim 1 wherein the OMM Function is further capable of:
receiving an Extended Router Solicitation (E-RtSol) from a second Mobile Node (MN2) whereby the MN2 requests handover to the VMAP and wherein the E-RtSol comprises its previous LCoA (LCoA-MN2);
sending a PathUM addressed to the LCoA-MN2; and
sending a Router Advertisement (RtAdv) to the MN2.

6. A method for handing over of a Mobile Node (MN) in a Mobile Internet Protocol version 6 (MIPv6) network from a first Access Router (AR1) to a second Access Router (AR2), wherein a Virtual Mobile Anchor Point (VMAP) is hierarchically below a Mobile Anchor Point (MAP) and above the AR1 and wherein the MN has a Regional Care-of Address (RCoA) valid under the MAP and a first Local Care-of Address (LCoA) valid under the AR1, the method comprising steps of:

receiving, at the VMAP, a unique value for the MN and the MN's RCoA in an Extended Local Binding Acknowledgment (E-LBA) addressed to the LCoA from the MAP;
creating a VMAP Binding Cache Entry for the MN, at the VMAP, in which the unique value for the MN is kept together with the LCoA and the RCoA;
sending, from the MN, an extended Router Solicitation Message (E-RtSol) to the AR2 thereby requesting handover of the MN to the AR2, the E-RtSol comprising the MN's LCoA;
sending, from the AR2, a Router Advertisement Message (RtAdv) to the MN;
sending, from the AR2, a Path Update Message (PathUM) addressed to the first LCoA of the MN;
receiving, at the VMAP, the PathUM;
computing, at the VMAP, a second LCoA (LCoA2) of the MN and;
forwarding, at the VMAP, traffic received on the LCoA to the LCoA2.

7. A Mobile Node (MN), in a Mobile Internet Protocol version 6 (MIPv6) network, connected to a first Access Router (AR1) using a first Local Care-of Address (LCoA) valid thereunder in a VMAP-enabled domain of the MIPv6 network, wherein the MN has a unique value associated therewith that is shared with a Mobile Anchor Point (MAP) of the VMAP-enabled domain and wherein the MN has a Regional Care-of Address (RCoA) valid under the MAP, the MN comprising:
an imprOved Micro Mobility Management (OMM) Function capable of:
detecting a need to handover from the AR1 to a second Access router (AR2);
sending an Extended Router Solicitation (E-RtSol) to the AR2 comprising the LCoA;
receiving a Router Advertisement (RtAdv) from the AR2; extracting 64 bits corresponding to the AR2's subnet prefix from the RtAdv; and
computing a second LCoA (LCoA2) valid under the AR2 using the following function:
LCoA2 equals the 64 bits corresponding to the AR2's subnet prefix concatenated with 64 bits obtained by hashing together the MN's RCoA, the MN's LCoA and the unique value associated with the MN.

8. The MN of claim 7 wherein the OMM Function is further capable of:
before computing the LCoA2, sending a Path Update Message (PathUM) addressed to the AR1, the PathUM comprising at least the 64 bits corresponding to the AR2's subnet prefix.

9. The MN of claim 7 wherein the OMM Function is further capable of:
after computing the LCoA2, sending a Path Update Message (PathUM) addressed to the LCoA, the PathUM comprising at least the 64 bits corresponding to the AR2's subnet prefix.

* * * * *

UNITED STATES PATENT AND TRADEMARK OFFICE
CERTIFICATE OF CORRECTION

PATENT NO. : 7,508,793 B2 Page 1 of 1
APPLICATION NO. : 11/229680
DATED : March 24, 2009
INVENTOR(S) : Haddad et al.

Figure 3:
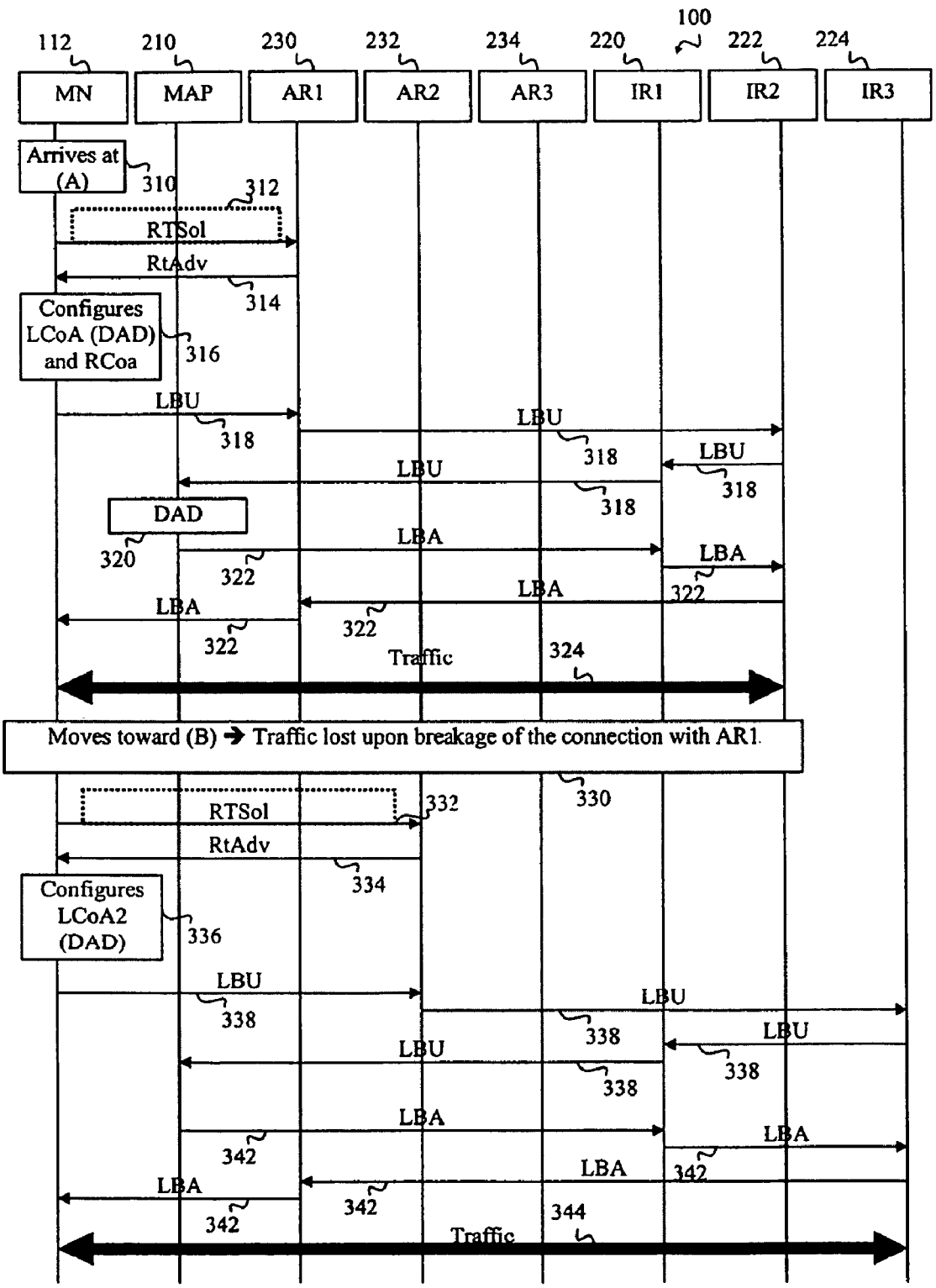
FIG. 3 is a nodal operation and flow chart of the actions and interactions between a Mobile Node and other nodes of an HMIPv6 domain when the MN enters therein in accordance with prior art.

It is certified that error appears in the above-identified patent and that said Letters Patent is hereby corrected as shown below:

In Fig. 3, Sheet 3 of 10, for Tag "316", Line 3, delete "RCoa" and insert -- RCoA --, therefor.

In Fig. 5, Sheet 6 of 10, for Tag "516", Line 3, delete "RCoa" and insert -- RCoA --, therefor.

In Column 1, Line 63, delete "HMIPv6specification" and insert -- HMIPv6 specification --, therefor at each occurrence through out the specification.

In Column 2, Line 42, delete "RCOA" and insert -- RCoA --, therefor at each occurrence through out the specification.

In Column 5, Line 19, delete "LCOA" and insert -- LCoA --, therefor at each occurrence through out the specification.

In Column 5, Line 20, delete "improved" and insert -- imprOved --, therefor at each occurrence through out the specification.

In Column 6, Line 65, delete "6architecture;" and insert -- 6 architecture; --, therefor.

In Column 8, Line 2, delete "VMAP 1" and insert -- VMAP1 --, therefor.

In Column 9, Line 5, delete "516)." and insert -- 516), --, therefor.

In Column 9, Line 22, delete "64bits" and insert -- 64 bits --, therefor.

In Column 10, Line 25, delete "[RCOA" and insert -- [RCoA --, therefor at each occurrence through out the specification.

In Column 15, Line 9, delete "IPv6Function" and insert -- IPv6 Function --, therefor.

Signed and Sealed this

Fifth Day of January, 2010

David J. Kappos
*Director of the United States Patent and Trademark Office*